US012038798B2

(12) United States Patent
Kim

(10) Patent No.: US 12,038,798 B2
(45) Date of Patent: Jul. 16, 2024

(54) METHOD FOR SELECTIVELY CONTROLLING VOLTAGE, AND ELECTRONIC DEVICE AND EXTERNAL ELECTRONIC DEVICE THEREFOR

(71) Applicant: Samsung Electronics Co., Ltd., Suwon-si (KR)

(72) Inventor: Kyoungwon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/581,130

(22) Filed: Jan. 21, 2022

(65) Prior Publication Data

US 2022/0147130 A1 May 12, 2022

Related U.S. Application Data

(63) Continuation of application No. PCT/KR2020/009795, filed on Jul. 24, 2020.

(30) Foreign Application Priority Data

Jul. 26, 2019 (KR) .......................... 10-2019-0091065

(51) Int. Cl.
*G06F 1/26* (2006.01)
*G06F 1/3296* (2019.01)
*G06F 13/42* (2006.01)

(52) U.S. Cl.
CPC .............. *G06F 1/266* (2013.01); *G06F 1/263* (2013.01); *G06F 13/4282* (2013.01); *G06F 1/3296* (2013.01); *G06F 2213/0042* (2013.01)

(58) Field of Classification Search
CPC .......... G06F 1/189; G06F 1/263; G06F 1/266; G06F 13/4068; G06F 13/4282;
(Continued)

(56) References Cited

U.S. PATENT DOCUMENTS

2006/0091897 A1 5/2006 Park
2016/0056651 A1 2/2016 Von Novak, III et al.
(Continued)

FOREIGN PATENT DOCUMENTS

JP 11-203265 A 7/1999
KR 10-0621104 B1 9/2006
(Continued)

OTHER PUBLICATIONS

"Universal Serial Bus Type-C Cable and Connector Specification". Release 1.3. Jul. 14, 2017. USB 3.0 Promoter Group. (Year: 2017).*
(Continued)

*Primary Examiner* — Thomas J. Cleary
(74) *Attorney, Agent, or Firm* — Jefferson IP Law, LLP

(57) ABSTRACT

An electronic device is provided. The electronic device includes a battery, a connector including one or more signal terminals, a power regulator for adjusting a first voltage from the battery to a second voltage, at least one processor operably connected to the one or more signal terminals and the power regulator, and a memory. The memory can store instructions, that during the execution thereof, allow the at least one processor to sense the connection to an external electronic device through the connector, acquire identification information about the external electronic device after outputting the second voltage through the connector onto the external electronic device connected through the connector, and output, on the basis of the identification information of the external electronic device, the first voltage onto the external electronic device through the connector by using a bypass route.

11 Claims, 12 Drawing Sheets

(58) Field of Classification Search
CPC ........... G06F 2213/0042; G06F 1/3296; G06F 1/3209; H02J 7/00; H02J 7/0063; H02J 7/0036; H01R 24/60; Y02D 10/00
See application file for complete search history.

(56) References Cited

U.S. PATENT DOCUMENTS

| | | | |
|---|---|---|---|
| 2017/0235694 A1* | 8/2017 | Lee | G09G 5/006 |
| | | | 710/106 |
| 2017/0242707 A1 | 8/2017 | Hays et al. | |
| 2017/0262035 A1 | 9/2017 | Agarwal et al. | |
| 2017/0344098 A1* | 11/2017 | Abu Hilal | G06F 13/4022 |
| 2018/0060261 A1* | 3/2018 | Chhor | G06F 13/4282 |
| 2018/0335819 A1* | 11/2018 | Waters | H02M 3/137 |
| 2019/0131810 A1 | 5/2019 | Lim et al. | |
| 2019/0138078 A1* | 5/2019 | Regupathy | G06F 1/3253 |
| 2019/0310700 A1* | 10/2019 | Waters | G06F 1/28 |
| 2019/0319446 A1* | 10/2019 | Mondal | H02H 1/0007 |
| 2019/0372376 A1 | 12/2019 | Kwak et al. | |
| 2020/0044458 A1 | 2/2020 | Yoon et al. | |
| 2021/0303048 A1* | 9/2021 | Jyani | G06F 1/266 |
| 2021/0318738 A1* | 10/2021 | Jackson | G06F 13/4282 |

FOREIGN PATENT DOCUMENTS

| | | |
|---|---|---|
| KR | 10-1575256 B1 | 12/2015 |
| KR | 10-2018-0038856 A | 4/2018 |
| KR | 10-2018-0129999 A | 12/2018 |
| KR | 10-2019-0049256 A | 5/2019 |
| KR | 10-2019-0136690 A | 12/2019 |

OTHER PUBLICATIONS

"Universal Serial Bus Type-C Cable and Connector Specification". Release 1.4. Mar. 29, 2019. USB 3.0 Promoter Group. (Year: 2019).*

Roberts, Steve. "DC/DC Book of Knowledge". Third Edition. 2016. RECOM Engineering GmbH & Co KG. (Year: 2016).*

"Universal Serial Bus Type-C™ Port Controller Interface Specification". Revision 2.0, Version 1.0. Oct. 2017. USB 3.0 Promoter Group. (Year: 2017).*

* cited by examiner

| | PIN No. | Signal Name | Note |
|---|---|---|---|
| 511a,511b | 1 | GND | Ground |
| 512a,512b | 2 | TX+ | Super speed TX positive |
| 513a,513b | 3 | TX- | Super speed TX negative |
| 514a,514b | 4 | $V_{BUS}$ | USB cable charging power |
| 515a,515b | 5 | CC | Identification terminal |
| 516a,516b | 6 | D+ | + line of the differential bi-directional USB signal |
| 517a,517b | 7 | D- | - line of the differential bi-directional USB signal |
| 518a,518b | 8 | SBU | Side Band Use : additional purpose pin (ex: Audio signal, display signal, etc) |
| 519a,519b | 9 | $V_{BUS}$ | USB cable charging power |
| 520a,520b | 10 | RX- | Super speed RX negative |
| 521a,521b | 11 | RX+ | Super speed TX positive |
| 522a,522b | 12 | GND | Ground |

FIG.5B

METHOD FOR SELECTIVELY CONTROLLING VOLTAGE, AND ELECTRONIC DEVICE AND EXTERNAL ELECTRONIC DEVICE THEREFOR

CROSS-REFERENCE TO RELATED APPLICATION(S)

This application is a continuation application, claiming priority under § 365(c), of an International application No. PCT/KR2020/009795, filed on Jul. 24, 2020, which is based on and claims the benefit of a Korean patent application number 10-2019-0091065, filed on Jul. 26, 2019, in the Korean Intellectual Property Office, the disclosure of which is incorporated by reference herein in its entirety.

BACKGROUND

1. Field

The disclosure relates to a method for selectively controlling a voltage, and an electronic device and an external electronic device therefor.

2. Description of Related Art

There has been increasing use of electronic devices that are easy to carry, such as smartphones, tablet personal computers (PCs), and wearable devices, and electronic devices may be configured to perform various functions. For example, electronic devices may perform various functions such as voice communication, Internet search, picture or moving image capture, music playback, and video watching.

An electronic device may be connected to various external electronic devices, and may receive data from an external electronic device or transmit data to an external electronic device. Furthermore, an electronic device may receive power from an external electronic device or transmit power to an external electronic device.

For example, an electronic device may be connected to a host device such as a computer or a charger and configured to receive power from the host device, or to perform data transmission/reception while receiving power from the host device. In addition, an electronic device may be connected to an on the go (OTG) device such as an earphone and configured to provide power to the OTG device or to perform data transmission/reception while providing power to the OTG device.

The above information is presented as background information only to assist with an understanding of the disclosure. No determination has been made, and no assertion is made, as to whether any of the above might be applicable as prior art with regard to the disclosure.

SUMMARY

An electronic device may be connected to an external electronic device through a connector, and may be connected to a universal serial bus (USB) host through a USB type C connector which is a standard specification for connecting an external electronic device.

An electronic device may be connected to a host device capable of providing power, but may also be connected to a USB OTG device (for example, earphone) incapable of providing power. For example, when connected to a USB OTG device, an electronic device may output a fixed magnitude of voltage through a connector. Given that the USB OTG device receives the fixed magnitude of voltage, unnecessary current consumption may occur in the process of converting to a driving voltage needed by the USB OTG device.

Therefore, when a USB OTG device is connected, an electronic device may need to supply power at a voltage needed by the USB OTG device.

Aspects of the disclosure are to address at least the above-mentioned problems and/or disadvantages and to provide at least the advantages described below. Accordingly, an aspect of the disclosure is to provide a method for selectively controlling a voltage, and an electronic device and an external electronic device therefor.

Additional aspects will be set forth in part in the description which follows and, in part, will be apparent from the description, or may be learned by practice of the presented embodiments.

In accordance with an aspect of the disclosure, an electronic device is provided. The electronic device includes a battery, a connector including one or more signal terminals, a power regulator configured to adjust a first voltage from the battery to a second voltage, at least one processor operatively connected to the one or more signal terminals and the power regulator, and a memory, wherein the memory stores instructions which, are configure to, when executed, cause the at least one processor to detect connection to an external electronic device through the connector, acquire identification information of the external electronic device after outputting the second voltage through the connector to the external electronic device connected through the connector, and based on the identification information of the external electronic device, output the first voltage to the external electronic device through the connector by using a bypass route.

In accordance with another aspect of the disclosure, a method performed by an electronic device for selectively controlling a voltage is provided. The method includes detecting connection to an external electronic device through a connector including one or more signal terminals, outputting a second voltage higher than a first voltage from a battery to the external electronic device through the connector, acquiring identification information of the external electronic device, and based on the identification information of the external electronic device, outputting the first voltage to the external electronic device through the connector by using a bypass route.

In accordance with another aspect of the disclosure, a method performed by an electronic device for receiving power from an external electronic device is provided. The method includes receiving a second voltage higher than a first voltage from a battery of an electronic device through a connector when connected to the electronic device by using a connector including one or more signal terminals, transmitting identification information of the external electronic device to the electronic device in response to reception of the second voltage, receiving the first voltage obtained by lowering the second voltage from the electronic device through the connector by using a bypass route of the electronic device in response to transmission of the identification information, and changing a power route in response to reception of the first voltage.

According to various embodiments, an external electronic device connected to an electronic device may be clearly identified, and power may be adjusted and supplied based on identification information of the external electronic device.

According to various embodiments, when an external electronic device can be driven by power lower than a fixed magnitude of power that an electronic device can supply, the electronic device may power supplied from a battery to the external electronic device through a connector without going through a power booster circuit.

According to various embodiments, an electronic device may selectively provide power from a battery or power obtained by boosting the power from the battery to an external electronic device, based on identification information of the external electronic device, thereby improving power efficiency.

According to various embodiments, when an external electronic device can operate with low power, it is possible to temporarily stop an operation of outputting power to the external electronic device by using a power terminal VBUS of a connector while outputting low power by using a driving terminal VCONN of the connector, and power consumption can thus be reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5B is a table describing pins of a connector according to an embodiment of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Unless defined otherwise, all terms used herein, including technical terms and scientific terms, may have the same meaning as commonly understood by a person of ordinary skill in the art to which the disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, eve the terms defined herein may not be construed to exclude embodiments of the disclosure.

Figure 1:
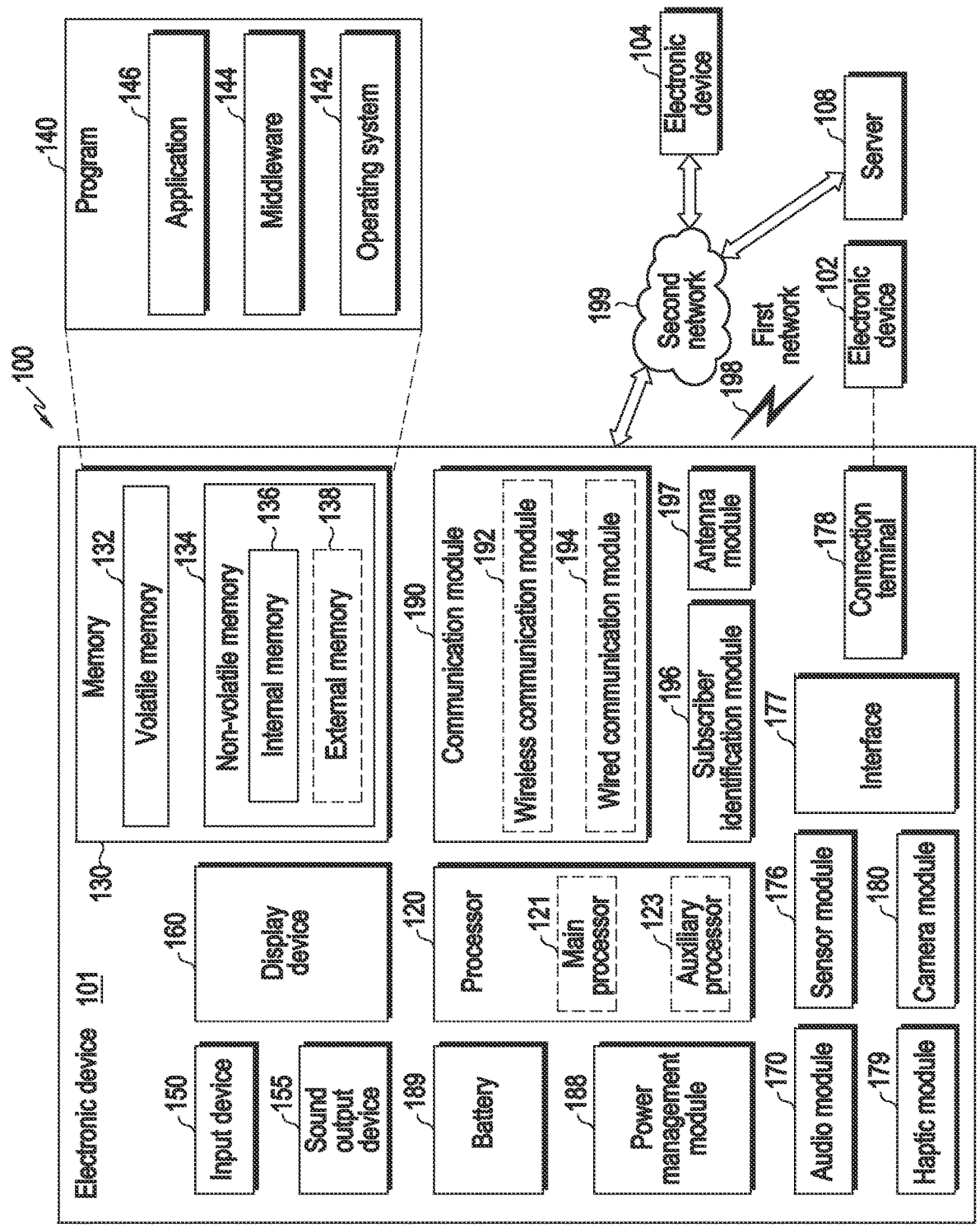
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197. At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
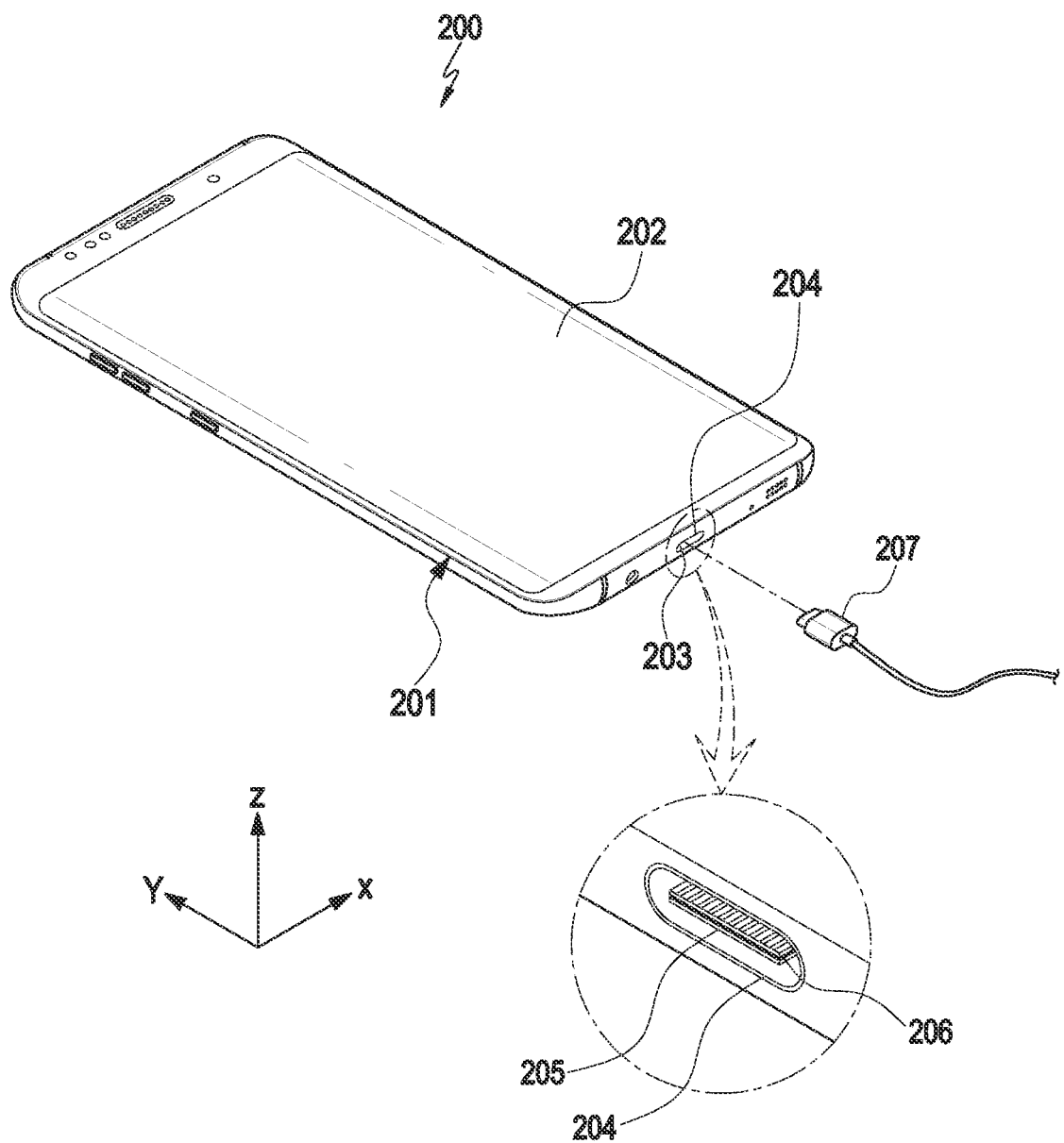
FIG. 2 is a perspective view of an electronic device according to an embodiment of the disclosure.

FIG. 2 is a perspective view of an electronic device 200 according to an embodiment of the disclosure.

Referring to FIG. 2, in the 3-axis Cartesian coordinate system, 'X' may refer to the width direction of the electronic device 200 (e.g., the electronic device 101 or the electronic device 102 of FIG. 1), 'Y' may refer to the length direction of the electronic device 200, and 'Z' may refer to the thickness direction of the electronic device 200.

The electronic device 200 may include a housing 201. According to one embodiment, the housing 201 may be formed of a conductive member and/or a non-conductive member. According to one embodiment, the electronic device 200 may include a touch screen display 202 (e.g., the display device 160 of FIG. 1) disposed to be exposed from at least a partial region of the housing 201. According to one embodiment, the touch screen display 202 may include a pressure sensor to operate as a pressure responsive touch screen display.

According to various embodiments, the electronic device may include a connector 203 (e.g., the connection terminal 178 of FIG. 1) configured to enable connection to an external electronic device. According to one embodiment, the connector 203 may be a socket-type connector.

According to various embodiments, an opening 204 may be formed through at least a partial region of the housing 201 such that the connector 203 is exposed therefrom, and the connector 203 may be disposed in the opening 204. According to various embodiments, the header-shaped external connector 207 may be coupled to the connector 203 in a forward direction or a reverse direction. A plurality of pins may be arranged in the external connector 207 to enable data transmission/reception or power reception even when the external connector 207 is plugged into the connector 203 in any direction, regardless of the direction. According to one embodiment, the external connector 207 may be connected to an external electronic device, and as the connector 203 and the external connector 207 are coupled to each other, the electronic device 200 and the external electronic device may be connected to each other. According to various embodiments, the external electronic device may be various external devices that can be connected to the electronic device 200. For example, the external device may include a TV, an audio device, a notebook, a computer, a charger, a memory, a fan, or an antenna (e.g., a digital multimedia broadcasting antenna or an FM antenna).

According to one embodiment, the connector 203 may be used as an interface for connecting an external electronic device or a power source (not shown) to the electronic device 200. The electronic device 200 may transmit data of the electronic device 200 to or receive data from the external electronic device through the external connector 207 connected to the connector 203. In addition, the electronic device 200 may receive power from a power source through the connector 203 or charge a battery by using the power source.

According to one embodiment, the connector 203 may include a universal serial bus (USB) type C and may have a contact substrate 205 disposed therein. In addition, a mid-plate 206 having electrically conductive properties may be disposed inside the contact substrate 205, and a plurality of pins may be disposed on upper and lower surfaces of the contact substrate 205.

Figure 3:
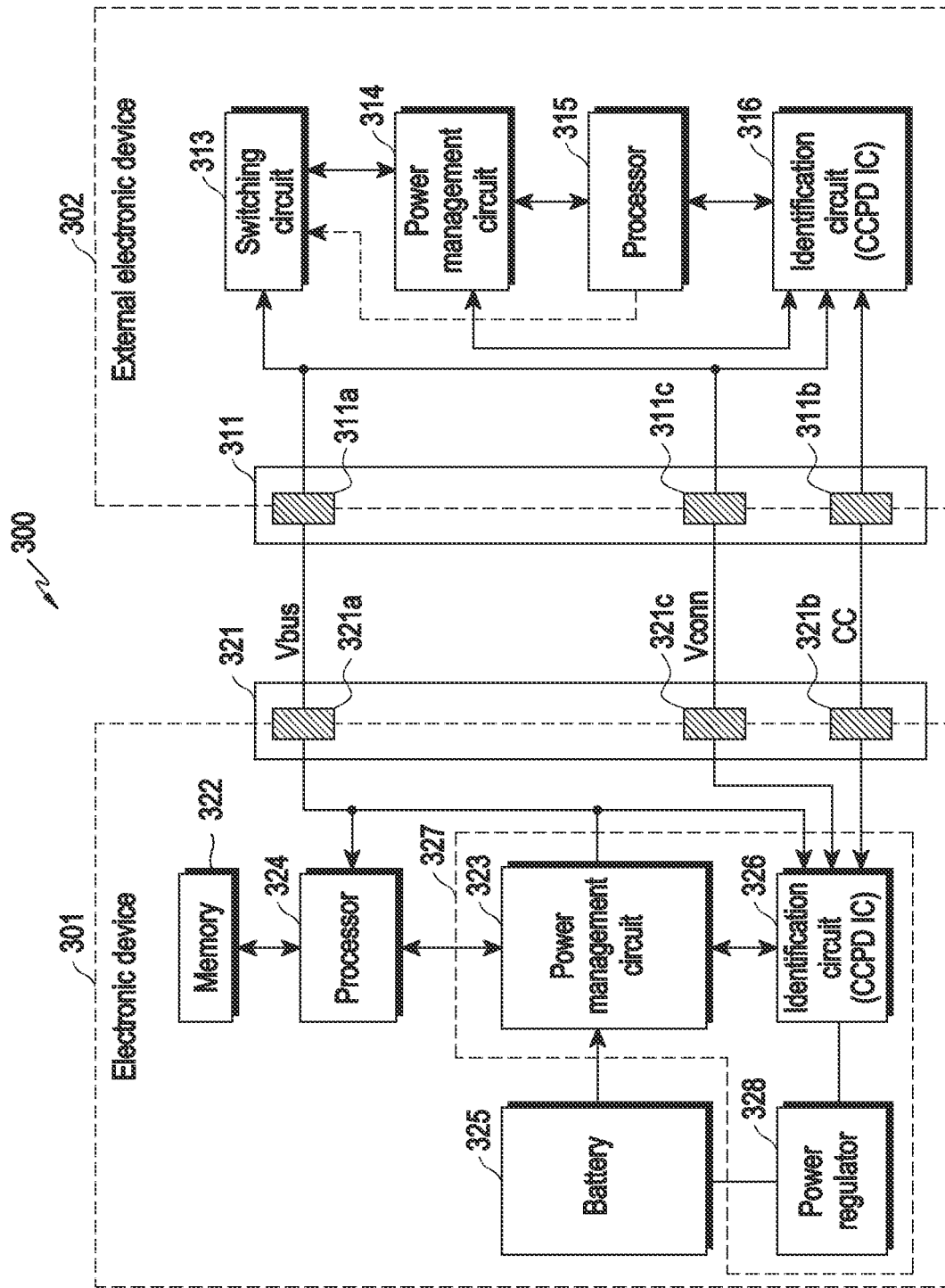
FIG. 3 is an internal block diagram of an electronic device and an external electronic device according to an embodiment of the disclosure.

FIG. 3 is an internal block diagram 300 of an electronic device and an external electronic device according to an embodiment of the disclosure.

Referring to FIG. 3, an electronic device 301 (e.g., the electronic device 101 of FIG. 1) according to various embodiments may operate in association with an external electronic device 302 (e.g., an accessory device such as an earphone) (e.g., the electronic device of FIG. 1). The external electronic device 302 may correspond to an accessory device that is functionally connected to the electronic device 301. For example, the external electronic device 302 may correspond to an accessory device such as an earphone, but may not be limited thereto.

The electronic device 301, when the external electronic device 302 is connected thereto, may determine a power-related role or a data-related role of the electronic device 301 and the external electronic device 302, based on information recognized through the connector 321. For example, the electronic device 301 may determine whether to operate as a host device (or downstream facing port (DFP)) or a client device (or upstream facing port (UFP)) in terms of data transfer and may determine whether to operate as a device (e.g., a source device) that supplies power or a device (e.g., a sink device) that receives power, in terms of power supply.

As described above, the electronic device 301 may be referred to as a host device, a source device, or a DFP device, and the external electronic device 302 may be referred to as a client device, a sink device, or a UFP device. According to one embodiment, the external electronic device 302 may be referred to as an accessory device connectable through the connector 321 of the electronic device 301 and may support a USB Type-C connector.

First, the electronic device 301 may include a connector 321 (e.g., the connection terminal 178 of FIG. 1), a power management module 327 (e.g., the power management module 188 of FIG. 1), a battery 325 (e.g., the battery 189 of FIG. 1), a memory 322 (e.g., the memory 130 of FIG. 1), and/or a processor 324 (e.g., processor 120 of FIG. 1). In addition, the power management module 327 may include a power regulator 328. FIG. 3 illustrates a case in which the power regulator 328 is included in the power management module 327, but the power regulator 328 may alternatively be disposed between the battery 325 and the power management module 327. According to one embodiment, the power regulator 328 may be implemented in the form of a separate module, but may not be limited thereto since the arrangement position thereof may be variously implemented. For example, the battery 325 may be connected to an input terminal of the power regulator 328, and an output terminal of the power regulator 328 may be connected to the connector 321.

The connector 321 may include one or more signal terminals and one or more power terminals electrically connected to the power regulator 328 of the power management module 327. Hereinafter, the terminals may be referred to as pins. In one embodiment, the electronic device 301 may be connected through a wire to an external electronic device (e.g., an accessory device) requiring power through the connector 321 and may be connected through a wire to an external electronic device (e.g., a charger) that supplies external power.

The connector 321 may include a power supply terminal 321a configured to supply or receive power, an identification terminal 321b configured to identify the external electronic device 302, a driving terminal 321c configured to supply power to an IC for accessory recognition of the external electronic device 302, and/or a ground terminal (not shown).

According to one embodiment, the connector 321 may have a USB connector standard. For example, according to the USB connector standard, the power supply terminal 321a may correspond to a VBUS terminal of a USB connector, the identification terminal 321b may correspond to a configuration channel (CC) terminal, and the driving terminal 321c may correspond to a VCONN terminal.

For example, when the connector 321 is a USB Type-C connector, the identification terminal 321b may correspond to a CC terminal, and the identification circuit 326 may correspond to a configuration channel integrated circuit (CCIC). Two CC terminals may be provided in the USB connector. For example, the CCIC may determine the directionality of a cable connected to the connector 321 such that one is used for the purpose of transmitting power to the external electronic device 302 and the remaining one is used for the purpose of determining what the external electronic device 302 connected to the connector 321 is and managing the connection.

According to one embodiment, the electronic device 301 and/or the external electronic device 302 may determine whether it is in a host mode or a client mode by using a Rp/Rd resistor connected to the identification terminal 321b. The electronic device 301 may determine whether to operate as a host or a client, by using a resistance applied to the pins of the connector, for example, depending on connection of the pins CC1 and CC2 of connector 321, which is made among Rp (Pull-Up Resistor) and Rd (Pull-Down Resistor) resistors, according to the characteristics of the external electronic device 302 to be connected thereto.

The power management module 327 may include a power management circuit 323 (IF-PMIC) and an identification circuit 326. The power management circuit 323 may perform a control such that power input from an external source or the battery 325 is converted into voltage and current suitable for use in the electronic device 301. For example, the power management circuit 323 may boost the voltage of the battery 325 to provide a constant current to a system that supplies power to each module of the electronic device 301. The power management circuit 323 may include the power regulator 328 for boosting the voltage of the battery 325, and alternatively, the power regulator 328 may be disposed outside the power management circuit 323. According to one embodiment, at least specific functions of functions of the power management circuit 323 may be performed by the processor 324.

The power regulator 328 may be referred to as a power regulator and may generate power having a different voltage or different current level, for example, by adjusting the voltage level or current level of power supplied from then external power source or battery 325. The power regulator 328 may adjust power of the external power source or the battery 325 to a voltage or current level suitable for each of specific elements of the elements included in the electronic device 301. According to one embodiment, the power regulator 328 may be implemented in the form of a low drop out (LDO) regulator or a switching regulator. According to one embodiment, the power regulator 328 may include a buck/booster IC.

In one embodiment, when the external electronic device 302, which is a USB on the go (OTG) device, is connected to the electronic device 301, the power regulator 328 may boost the voltage of a battery to a voltage (e.g., about 5V) required for the USB OTG device and may supply the boosted voltage to the USB OTG device. The USB OTG device may refer to a device acting as a slave in a master (or host)/slave configuration. Alternatively, the USB OTG device may refer to a device configured to select a master (or host) or a slave through an ID terminal.

The identification circuit 326 may transmit data received through the identification terminal 321b (e.g., a CC terminal) of the connector 321 to the processor 324 and transmit a message or information generated by the processor 324 to the external electronic device 302 through the identification terminal 321b of the connector 321. The identification circuit 326 may include at least one of a micro-usb interface controller (MUIC), a cable and connector integrated chip (CCIC), or a power delivery integrated chip (PDIC).

The identification circuit 326 may be connected to the identification terminal 321b of the connector 321, determine what the external electronic device 302 connected to the connector 321 is, and transmit information on the external electronic device 302 to the processor 324. According to one embodiment, identification information on the external electronic device 302 may be transmitted to the processor 324 from the external electronic device 302 via PD communication.

The identification circuit 326 may be implemented in the form of a chip independent from the processor 324 of the electronic device 301, as shown in FIG. 3, but may be implemented by being included in a part of the processor 324 of the electronic device 301. In various embodiments, the identification circuit 326 may be omitted. For example, in various embodiments, the electronic device 301 may be implemented without including the identification circuit 326.

According to one embodiment, the electronic device 410, when electrically connected to the external electronic device 420, may receive power supplied from the external electronic device 420. For example, the electronic device 410 may receive power from the external electronic device 420 through a power terminal (e.g., a V_BUS of a USB connector) of a connector. The electronic device 410 may be driven using power supplied from the external electronic device 420.

According to various embodiments, an electronic device may include a battery, a connector including one or more signal terminals, a power regulator configured to adjust a first voltage from the battery to a second voltage, at least one processor operatively connected to the one or more signal terminals and the power regulator, and a memory. The memory may store instructions which, are configure to, when executed, cause the at least one processor to detect the connection to an external electronic device through the connector, acquire identification information on the external electronic device after outputting the second voltage through the connector to the external electronic device connected through the connector, and based on the identification information of the external electronic device, output the first voltage to the external electronic device through the connector by using a bypass route.

According to one embodiment, the instructions may be configured to cause the at least one processor to acquire the identification information from the external electronic device through USB power delivery (PD) communication with the external electronic device.

According to one embodiment, the instructions may be configured to cause the at least one processor to output the first voltage to the external electronic device through the connector when the external electronic device is a device capable of voltage adjustment, based on the identification information.

According to one embodiment, the instructions may be configured to cause the at least one processor to maintain the operation of outputting the second voltage using the power regulator to the external electronic device through the connector when the external electronic device is a fixed voltage device voltage, based on the identification information.

According to one embodiment, the identification information may include at least one of ID of the external electronic device, information indicating that the external electronic device is capable of voltage adjustment, and information indicating that the external electronic device is operable at a low voltage.

According to an embodiment, the instructions may be configured to cause the at least one processor to output the second voltage by using a power terminal (VBUS) among the one or more signal terminals when connection to the external electronic device is detected through the connector.

According to one embodiment, the instructions may be configured to cause the at least one processor to output the second voltage by using a driving terminal (VCONN) among the one or more signal terminals, when the voltages of at least specific terminals of the one or more signal terminals are detected after the second voltage is output using the power terminal (VBUS).

According to one embodiment, the instructions may be configured to cause the at least one processor to output the first voltage to the external electronic device by using a driving terminal (VCONN) among the one or more signal terminals, when the external electronic device is a device capable of voltage adjustment, based on the identification information.

According to one embodiment, the instructions may be configured to cause the at least one processor to temporarily stop the operation of outputting the second voltage to the external electronic device by using the power terminal (VBUS) while the first voltage is output to the external electronic device by using the driving terminal (VCONN), when the external electronic device is operable at a low voltage, based on the identification information.

According to one embodiment, at least specific operations of the at least one processor may be performed in a configuration channel (CC) power delivery (PD) IC.

The external electronic device 302 may include a connector 311, a switching circuit 313, a power management circuit 314, a processor 315 (e.g., a central processing unit (CPU), an MCU or an application processor (AP)), and an identification circuit 316.

According to one embodiment, the external electronic device 302 may include a power receiving terminal 311a configured to receive power from the electronic device 301, an identification terminal 311b configured to identify the electronic device 301, an identification circuit 316, and a driving terminal 311c and/or a ground terminal (not shown) configured to supply other driving power. For example, the power receiving terminal 311a may be referred to as a VBUS terminal, and the driving terminal 311c may be referred to as a VCONN terminal.

According to one embodiment, the power management circuit 314 may include a buck converter configured to step-down the received voltage to a constant voltage so as to supply power to each module of the external electronic device 302.

According to one embodiment, the external electronic device 302 may include a switching circuit 313 capable of selectively receiving a VBUS voltage and a VCONN voltage. According to one embodiment, the VCONN voltage may be used for power supply of the identification circuit 316 or may be used as driving power of the external electronic device 302.

The configuration of the electronic device 301 and the external electronic device 302 as described above will be described with reference to FIGS. 4A and 4B in detail.

Figure 4A:
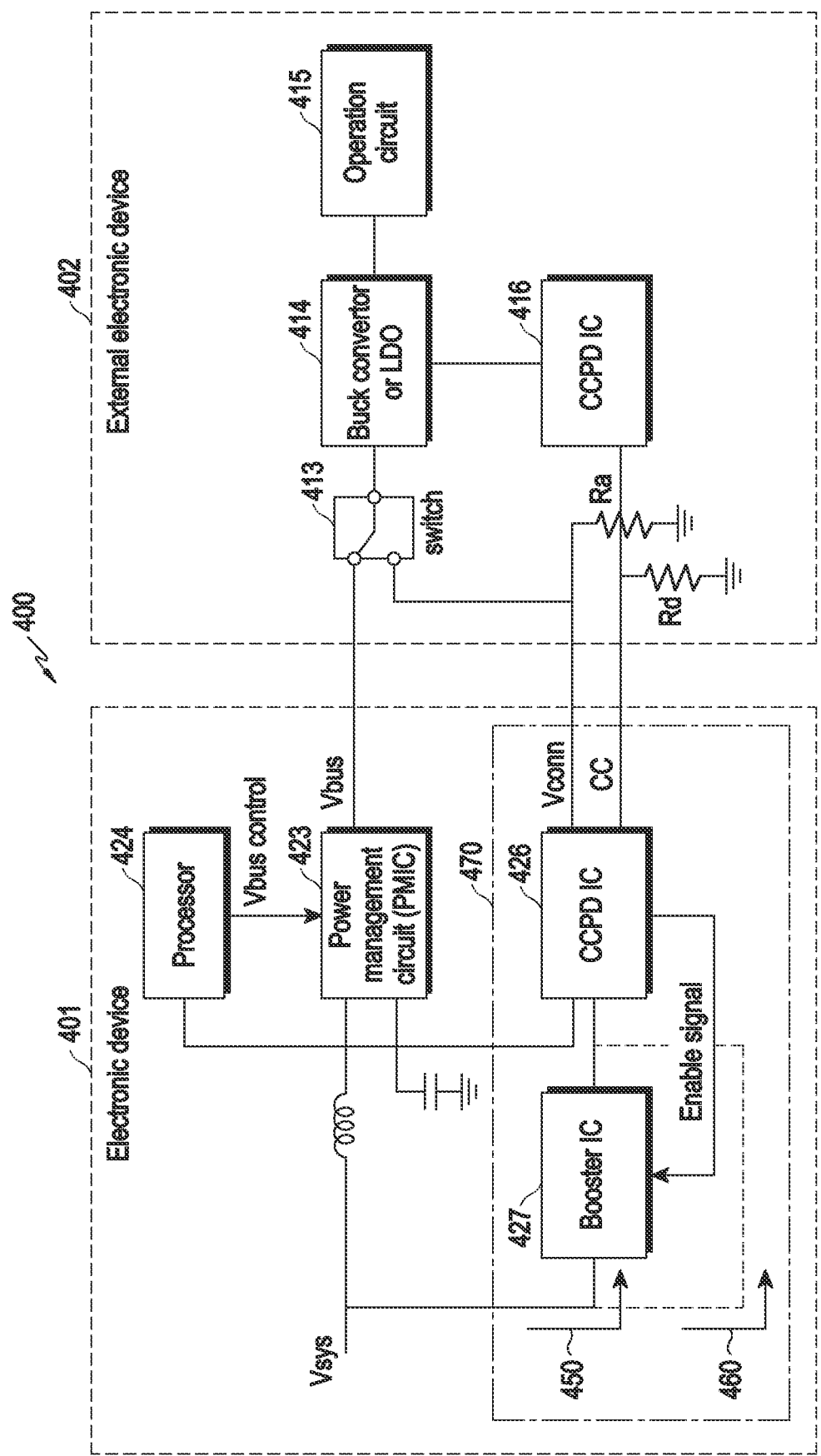
FIG. 4A is an internal block diagram of an electronic device and an external electronic device according to an embodiment of the disclosure.

FIG. 4A is an internal block diagram 400 of an electronic device and an external electronic device according to an embodiment of the disclosure.

Referring to FIG. 4A, the electronic device 401 may include a power management circuit 423, a processor 424, a CCPD IC 426, and a booster IC 427. The power management circuit 423, the processor 424, the CCPD IC 426, and the booster IC 427, which are shown in FIG. 4A, may be a group of elements respectively corresponding to the power management circuit 323, the identification circuit 326, the processor 324, and the power regulator 328, which are shown in FIG. 3, and a detailed description thereof will be omitted.

Referring to FIG. 4A, when the voltage of the battery is referred to as Vsys, the Vsys voltage may be boosted to a default voltage (e.g., about 5V) through the booster IC 427 which is a first route 450, and through a bypass route which a second route 460, the Vsys voltage may range from about 3.5V to 4.3V, which is the range of the battery voltage. For example, the bypass route may be a route that does not pass through the booster IC 427.

Figure 4B:
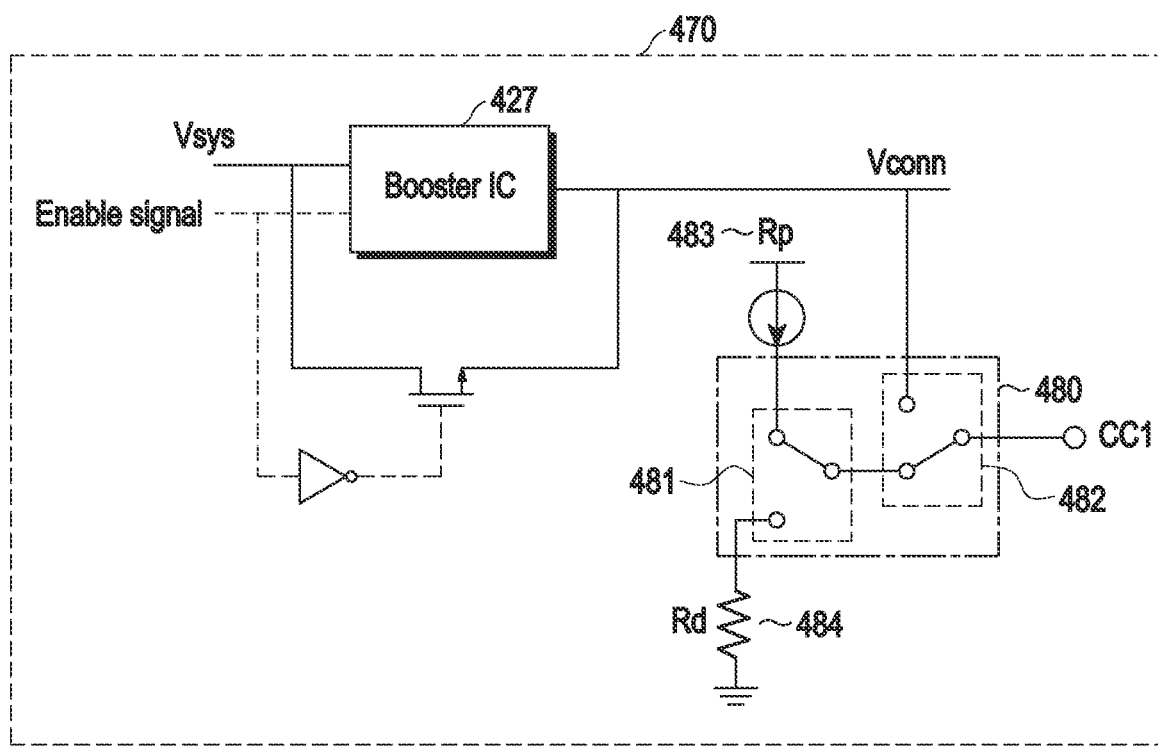
FIG. 4B is a diagram illustrating a bypass route of an electronic device according to an embodiment of the disclosure.

The bypass route 470 of the electronic device of FIG. 4A according to various embodiments may be specifically illustrated as shown in FIG. 4B. One of the Vsys voltage or the boosted default voltage may be selectively output as the VCONN voltage under the control of the processor 324 or the power management circuit 423. For example, when the external electronic device 402 is a device capable of voltage adjustment, a VCONN voltage corresponding to the Vsys voltage may be provided to the external electronic device 402.

FIG. 4B is a diagram illustrating a bypass route of an electronic device according to an embodiment of the disclosure.

Referring to FIG. 4B, according to one embodiment, the booster IC 427 may be connected to the processor 324 or the power management circuit 423 and may include a switch 480 between the booster IC 427 and the processor 324 or the power management circuit 423. The switch 480 may include a first switch 481 and a second switch 482. The first switch 481 may supply the VCONN signal to the CC1 pin or connect the CC1 pin to the second switch 482, in response to the first switch signal output from the processor 324 or the power management circuit 423. The second switch 482 may connect the first switch 481 to any one of a pull-up resistor (Rp) 483 and a pull-down resistor (Rd) 484.

If the bypass route is used as described above, the Vsys voltage may correspond to the VCONN voltage, and low voltage power may be supplied to the external electronic device 402.

Accordingly, the external electronic device 402 may directly use an input voltage in the operation circuit 415 without going through the buck converter or the LDO 414, and thus may be advantageous in terms of efficiency and operational current consumption.

Table 1 shows a relationship between power efficiency and operational current consumption of an external electronic device, such as an earphone, according to the VCONN voltage.

TABLE 1

| Vconn voltage | Power efficiency of external electronic device | Operational current consumption |
|---|---|---|
| 5 V | 90% | 20 mA |
| 4 V | 95% | 15 mA |
| 3.6 V | 98% | 12 mA |
| 3.3 V | 100% | 10 mA |

As noted from Table 1, when the VCONN voltage is lower, the power efficiency is higher, and thus the current consumption is lower.

Figure 5A:
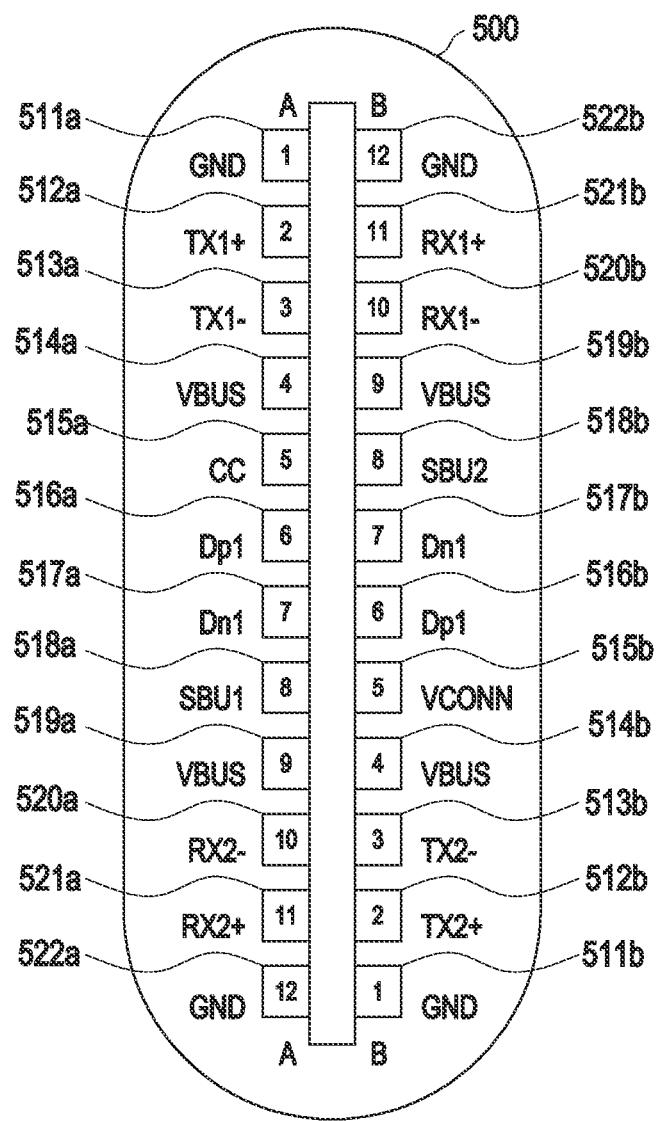
FIG. 5A illustrates pins of a connector according to an embodiment of the disclosure.

FIG. 5A illustrates pins of a connector according to an embodiment of the disclosure.

Referring to FIG. 5A, a connector 500 (e.g., the connection terminal 178 of FIG. 1 or the connector 321 or 311 of FIG. 3) according to various embodiments may be a USB Type-C connector. The connector 500 may include a plurality of pins. According to various embodiments, the connector 500 may include a plurality of first pins on a first surface (e.g., surface A) corresponding to the forward direction and a plurality of second pins on a second surface (e.g., surface B) corresponding to the reverse direction. For example, the plurality of first pins may include a GND pin 511a, a TX1+ pin 512a, a TX1− pin 513a, a VBUS pin 514a, a CC pin 515a, a Dp1 pin 516a, a Dn1 pin 517a, an SBU1 pin 518a, a VBUS pin 519a, an RX2− pin 520a, an RX2+ pin 521a, and a GND pin 522a. For example, the plurality of second pins may include a GND pin 511b, a TX2+ pin 512b, a TX2− pin 513b, a VBUS pin 514b, a VCONN pin 515b, a Dp1 pin 516b, a Dn1 pin 517b, an SBU1 pin 518b, a VBUS pin 519b, an RX1− pin 520b, an RX1+ pin 521b, and a GND pin 522b.

The electronic device (e.g., the electronic device 101 and 301 of FIGS. 1 and 3) may be electrically connected to an external electronic device (e.g., the external electronic device 302 of FIG. 3) through the connector 500. The connector 500 of the electronic device may have an external shape allowing the connector of the external electronic device to be inserted in any direction of a forward direction or a reverse direction. For example, the arrangement order of the twelve pins formed on the first surface (e.g., surface A) may be the same as the arrangement order of the twelve pins formed on the second surface (e.g., surface B) such that the connector of the external electronic device can be inserted in any direction in the first surface direction or the second surface direction. Due to the structure, a user may insert the connector of the external electronic device into the connector 500 of the electronic device while rotating the same by 180 degrees.

According to one embodiment, the arrangement of pins formed on the first surface (e.g., surface A) and the second surface (e.g., surface B) of the contact board formed inside the connector 500 is as shown in FIG. 5B.

FIG. 5B is a table describing pins of a connector according to an embodiment of the disclosure.

Referring to FIG. 5B, the TX1+ pin and TX2+ pins 512a and 512b and TX1− pin and TX2− pin 513a and 513b may be pins for super speed TX capable of fast data transmission, the VBUS pins 514a and 514b may be pins for power for USB cable charge, the CC pin 515a may be a pin serving as an identification terminal, the VCONN pin 515b may be a pin for supporting plug power, the Dp1 pins 516a and 516b and Dn1 pins 517a and 517b may be pins for different bidirectional USB signals, the SBU1 pin and SBU2 pin 518a and 518b as extra pins may be pins that can be used for various signals (e.g., audio signals, display signals, etc.), the RX2− pins and RX1− pins 520*a* and 520*b* and the RX2+ pins and RX1+ pins 521*a* and 521*b* may be pins for super speed RX capable of fast data reception.

The electronic device and/or the external electronic device which are connected through the USB Type-C connector may determine whether to operate in the host mode or the client mode through communication using the CC pin. According to one embodiment, the electronic device and/or the external electronic device may determine whether it is in the host mode or the client mode by using the Rp/Rd resistor connected to the CC pin.

Figure 6A:
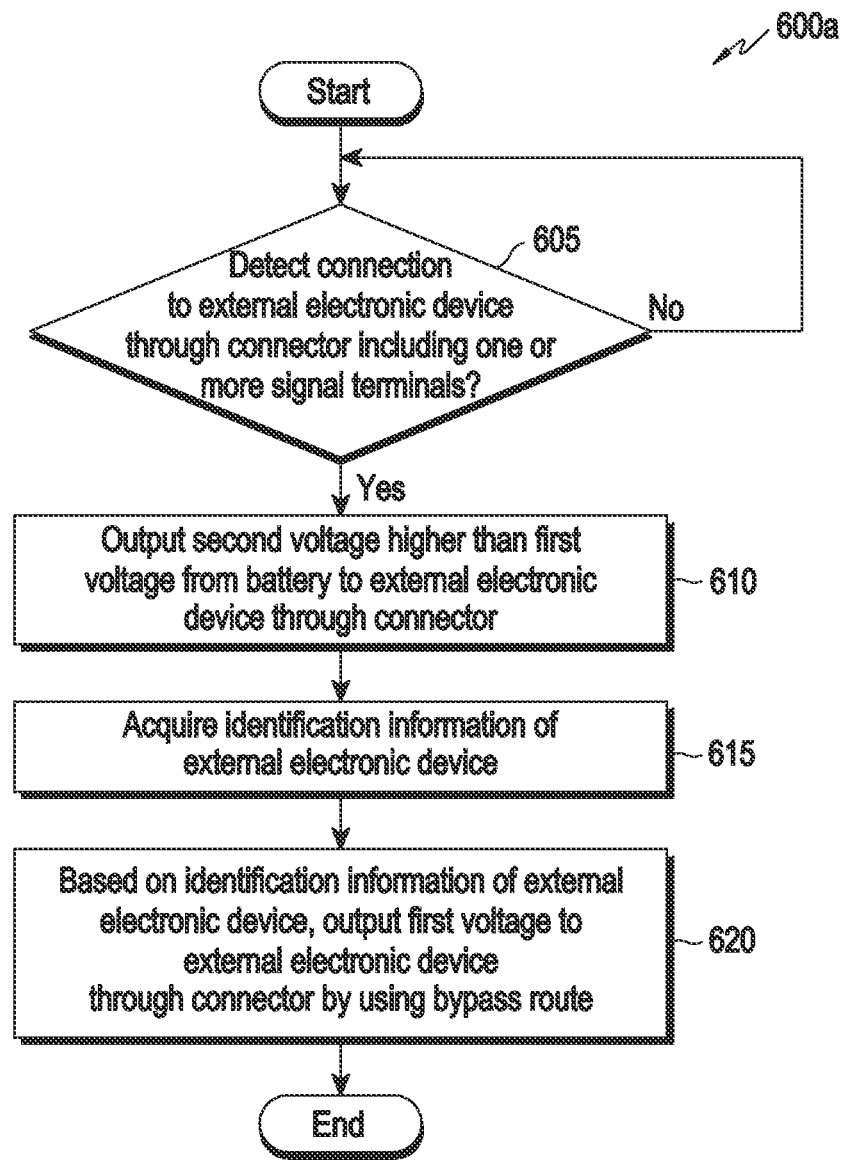
FIG. 6A is a flowchart of an operation an electronic device for selectively controlling a voltage, according to an embodiment of the disclosure.

FIG. 6A is a flowchart 600*a* of an operation of an electronic device for selectively controlling a voltage, according to an embodiment of the disclosure.

Referring to FIG. 6A, the operating method may include operations 605 to 620. Each operation of the operating method may be performed by at least one of an electronic device (e.g., the electronic devices 101 and 301 of FIGS. 1 and 3) and at least one processor (e.g., the processor 120 and 324 of FIGS. 1 and 3) of the electronic device. According to one embodiment, at least one of operations 605 to 620 may be omitted, the order of specific operations may be changed, or another operation may be added.

Referring to FIG. 6A, in operation 605, the electronic device may detect connection to an external electronic device through a connector including one or more signal terminals. According to one embodiment, the electronic device may output the second voltage by using a power terminal (VBUS) among the one or more signal terminals when connection to the external electronic device is detected through the connector.

In operation 610, the electronic device may output a second voltage higher than a first voltage from the battery to the external electronic device through the connector.

In operation 615, the electronic device may acquire identification information of the external electronic device. According to one embodiment, the electronic device may include acquiring the identification information from the external electronic device through USB power delivery (PD) communication with the external electronic device. According to one embodiment, the identification information may include at least one of ID of the external electronic device, information indicating that the external electronic device is capable of voltage adjustment, and information indicating that the external electronic device is operable at a low voltage.

In operation 620, based on identification information of the external electronic device, the electronic device may output the first voltage to the external electronic device through the connector by using a bypass route. According to one embodiment, based on the identification information, the electronic device may output the first voltage to the external electronic device through the connector when the external electronic device is a device capable of voltage adjustment. For example, the electronic device may output the first voltage to the external electronic device by using a driving terminal (VCONN) among the one or more signal terminals, when the external electronic device is a device capable of voltage adjustment, based on the identification information.

According to one embodiment, based on the identification information, when the external electronic device is a fixed voltage device, the electronic device may maintain the operation of outputting the second voltage using the power regulator to the external electronic device through the connector.

According to one embodiment, when voltages of at least specific terminals of the one or more signal terminals are detected after the second voltage is output using the power terminal (VBUS), the electronic device may output the second voltage by using the driving terminal (VCONN) among the one or more signal terminals.

According to one embodiment, based on the identification information, when the external electronic device is operable at a low voltage, the electronic device may temporarily stop outputting the second voltage to the external electronic device by using the power terminal (VBUS) while the first voltage is output to the external electronic device by using the driving terminal (VCONN).

Figure 6B:
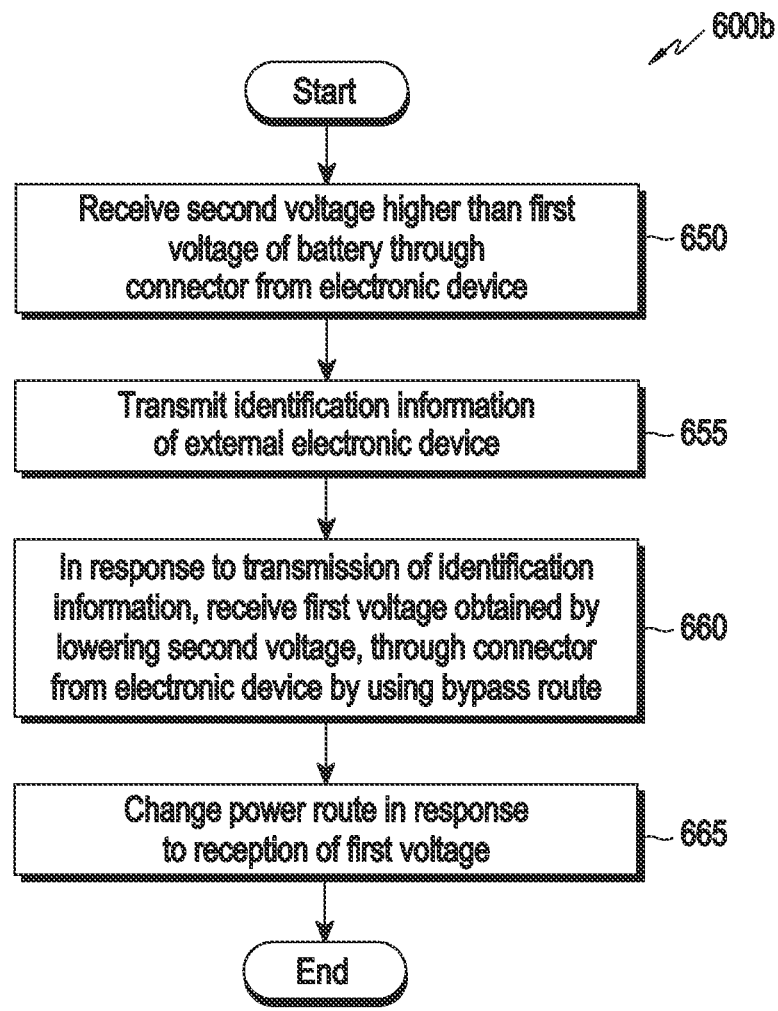
FIG. 6B is an operation flowchart of an external electronic device connected to an electronic device according to an embodiment of the disclosure.

FIG. 6B is a flowchart 600*b* of an operation of an external electronic device connected to the electronic device according to an embodiment of the disclosure.

Referring to FIG. 6B, the operating method may include operations 650 to 665. Each operation of the operating method may be performed by at least one of electronic device (e.g., the external electronic device 302 of FIG. 3) and at least one processor of the electronic device (e.g., the processor 315 of FIG. 3). According to one embodiment, at least one of operations 650 to 665 may be omitted, the order of specific operations may be changed, or another operation may be added.

In operation 650, the external electronic device may receive a second voltage higher than a first voltage of the battery of the electronic device from the electronic device through the connector. For example, the external electronic device may receive a VCONN voltage of about 5V from the electronic device.

In response to reception of the second voltage, in operation 655, the external electronic device may transmit identification information of the external electronic device to the electronic device through the connector. For example, the external electronic device may provide various identification information related to the external electronic device, such as information on whether the same is a type of an OTG device supportable by the electronic device, information indicating whether a voltage thereof can be changed to VCONN voltage, information on whether a VCONN voltage can be used as input voltage (or input power) if the voltage thereof can be changed to VCONN voltage.

In operation 660, in response to transmission of the identification information, the external electronic device may receive the first voltage obtained by lowering the second voltage from the electronic device through a connector by using a bypass route. The bypass route may indicate a route in which the voltage of the battery of the electronic device is not boosted.

For example, in response to reception of a VCONN voltage of about 5V, which is a default voltage, the external electronic device may transmit identification information to inform the electronic device that the same is a device capable of receiving a voltage lower than the default voltage. Correspondingly, the electronic device may provide a voltage lower than the default voltage of about 5V, for example, the VCONN voltage adjusted to about 3.5V, to the external electronic device through the connector by using the bypass route in the electronic device. In this case, the VCONN voltage may be a voltage for supplying communication power, for example, for waking up the CCPD IC 416 of FIG. 4A.

In operation 665, the external electronic device may change the power route in response to the reception of the first voltage. According to various embodiments, when the external electronic device notifies the electronic device that the same can use the VCONN voltage as an input voltage instead of the VBUS voltage through transmission of identification information of the external electronic device, the external electronic device may use the VCONN voltage as an input voltage by controlling switching of the power switch 413 of FIG. 4A. Accordingly, the VCONN voltage without boosting the output voltage of the battery, for example, adjusted to about 3.5 V may be provided to the CCPD IC 416 through the connector, and the VBUS voltage may be provided to other elements of the external electronic device, for example, to the buck converter or LDO 414 of FIG. 4A. In this case, the VBUS voltage may be supplied to the external electronic device simultaneously with the VCONN voltage through each of the VBUS pin and VCONN pin of the connector.

According to one embodiment, when the VCONN voltage can be used as an input voltage instead of the VBUS voltage, the external electronic device may control the switching of the power switch 413 of FIG. 4A to provide a voltage, that is the VCONN voltage, through one of the VBUS voltage and the VCONN voltage to other elements of the external electronic device, for example, to the buck converter or the LDO 414 of FIG. 4A. In this case, the VBUS voltage through the VBUS pin of the connector may be turned off.

Figure 7A:
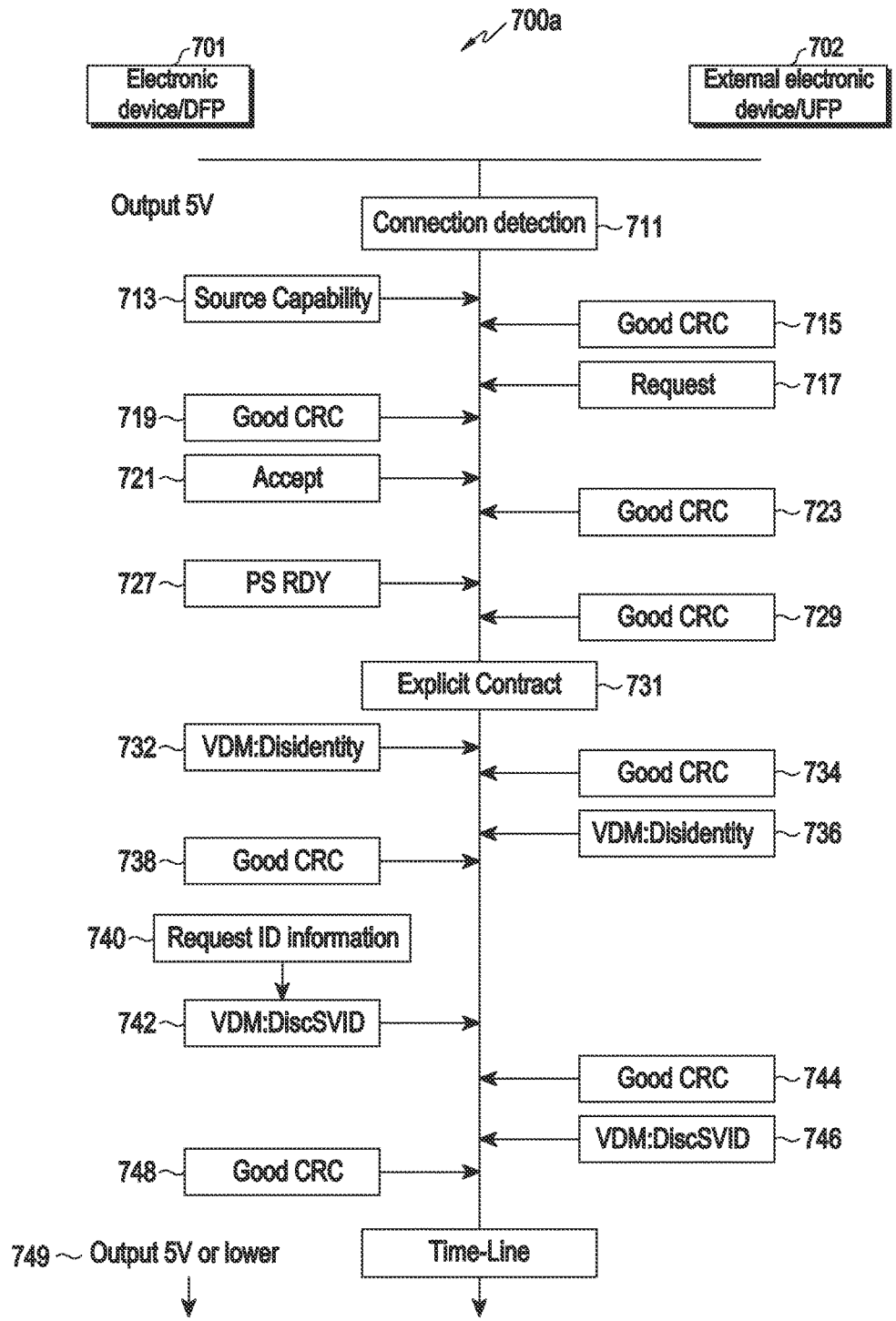
FIG. 7A is a flowchart of an operation according to a USB power delivery (PD) standard according to an embodiment of the disclosure.

FIG. 7A is a flowchart 700*a* of an operation according to a USB PD standard according to an embodiment of the disclosure.

Referring to FIG. 7A, an electronic device 701 may refer to a downstream facing port (DFP) device, and an external electronic device 702 may refer to an upstream facing port (UFP) device. In addition, since the electronic device 701 may provide power to the external electronic device 702, the same may operate as a source device (or a host device), and since the external electronic device 702 may receive power from the electronic device 701, the same may operate as a sink device (or a client device).

In operation 711, each of the electronic device 701 and the external electronic device 702 may detect physical connection therebetween through a connector (e.g., the connectors 321 and 311 of FIG. 3).

In operation 713, the electronic device 701 may transmit a source capability as an option of outputable power to the external electronic device 702. For example, the electronic device 701 may support a default voltage as an option of outputable power.

In operation 717, the external electronic device 702 may transmit a response signal (e.g., 'Request') selected as a power option in response to the received source capability. For example, the external electronic device 702 may request transmission of a default voltage.

In operation 721, the electronic device 701 may transmit a confirmation signal (e.g., an 'Accept' signal) in response to the response signal. According to one embodiment, according to the USB PD standard, operations 711 to 723 may be defined as power data object (PDO) connection. Accordingly, the electronic device 701 may generate a voltage corresponding to the power option requested from the external electronic device 702 and transmit a PS RDY signal (or message) to the external electronic device 702 in operation 727 to inform that the preparation for power transmission has been completed. In this case, the PS RDY (power supply ready) signal may be a term defined in the USB PD standard.

In operation 731, for example, when the external electronic device 702 confirms the PS RDY signal, the electronic device 701 may supply power corresponding to the option requested by the external electronic device 702 according to an explicit contract. The electronic device 701 may supply power of a default voltage 749, and the default voltage may be, for example, 5V to 5.2V. For example, the electronic device 701 may supply a default voltage to the external electronic device 702 through a power terminal (e.g., a VBUS terminal) of a connector. At the same time, the electronic device 70 may supply the default voltage VCONN to the external electronic device 702 even through the CC terminal of the connector. For example, when VCONN is used to supply communication power to the external electronic device 702, the VCONN may have a default voltage level. The VCONN may be, for example, a voltage supplied using a CC terminal, and a terminal outputting VCONN may be referred to as a driving terminal (e.g., a VCONN terminal).

The 'Good CRC' (cyclic redundancy check) signals 715, 719, 723, 729, 734, 738, 744, and 748 of FIG. 7A may be refer to ACK signals through which the electronic device 701 and the external electronic device 702 notify each other of reception of a signal according to the USB PD standard, and a detailed description thereof will be omitted.

According to one embodiment, the electronic device 701 may acquire identification information from the external electronic device 702 by using a vendor defined message (VDM) through PD communication.

In operation 732, the electronic device 701 may perform authentication on the external electronic device 702 by receiving a response signal in operation 736 in response to transmission of a VDM (e.g., 'Disidentity'). In addition, in operation 740, the electronic device 701 may request identification information of the external electronic device 702, for example, ID information of the external electronic device 702, and accordingly, in operation 742, may transmit a VDM (e.g., 'DiscSVID') to the external electronic device 702 to receive a response signal including ID information, which is identification information, in operation 746. For example, the electronic device 701 may request and confirm whether the external electronic device 702 is a USB Vender ID. The Vender ID may be transmitted while being included in the VDM transmitted and received in USB Type-C-based communication.

According to one embodiment, the identification information may be received while information such as an identifier (e.g., a vendor ID) and model information for the external electronic device 702 is being included in the VDM. According to one embodiment, the identification information using the VDM may be acquired from the external electronic device 702 through the CC terminal of a connector.

Figure 7B:
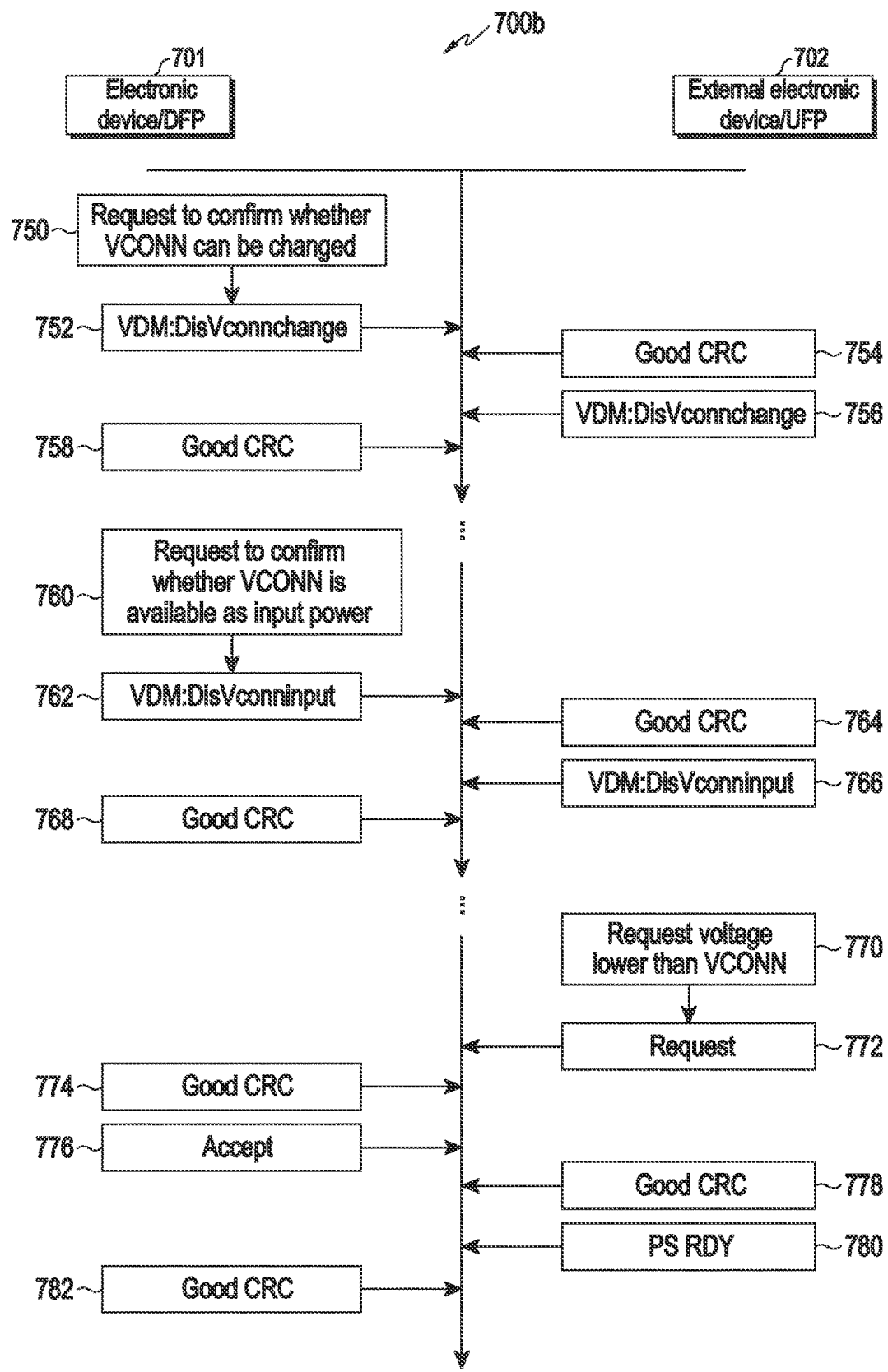
FIG. 7B is a flowchart of an operation for selectively controlling a voltage according to an embodiment of the disclosure.

FIG. 7B is a flowchart 700*b* of an operation for selectively controlling a voltage according to an embodiment of the disclosure.

According to one embodiment, FIG. 7B may show an operation after operation 748 illustrated in FIG. 7A. Based on the time-line shown in the middle of FIG. 7A, a left side may correspond to an output signal from the electronic device 701, and a right side may correspond to an output signal from the external electronic device 702. Hereinafter, the 'Good CRC' signals 754, 758, 764, 768, 774, 778, and 782 of FIG. 7B may be refer to ACK signals through which the electronic device 701 and the external electronic device 702 notify each other of reception of a signal, and a detailed description thereof will be omitted.

Referring to FIG. 7B, as the POD connection between the electronic device 701 and the external electronic device 702 has been completed, the electronic device 701 may transmit power to the external electronic device 702.

According to one embodiment, while the electronic device 701 transmits power to the external electronic device 702, for example, while the electronic device 701 outputs a second voltage obtained by boosting a first voltage of the battery to the VBUS terminal, the electronic device 701 may request and acquire desired information from the external electronic device 702 by using the VDM. In this case, the external electronic device 702 may be driven by the power output through the VBUS terminal, and the second voltage may be simultaneously output through the VBUS terminal and the VCONN terminal. Alternatively, the second voltage may be output through the VCONN terminal after PD communication. For example, when the VBUS and VCONN voltages are output simultaneously, the electronic device 701 may supply power having the same level as the VBUS voltage by using the VCONN voltage as the default voltage, but, after PD communication, the electronic device 701 may supply power by selectively setting the level of the VCONN voltage to be lower than the default voltage.

According to one embodiment, after the PD communication, the VCONN voltage may be selectively adjusted to be output, based on the identification information of the external electronic device 702 acquired through the PD communication. For example, based on the identification information, when it is determined that the external electronic device 702 is operable even at a low voltage, the first voltage using the bypass route, rather than the second voltage obtained by boosting the first voltage of the battery, may be supplied as the VCONN voltage to the external electronic device 702. On the other hand, when the external electronic device 702 is not a device operable at a low voltage, that is, a device capable of receiving only a fixed voltage, the electronic device 701 may maintain the operation of outputting the second voltage (e.g., the default voltage) simultaneously through the VBUS terminal and the VCONN terminal.

As described above, identification information of the external electronic device 702 may be used as a reference for determining whether to selectively lower the VCONN voltage, and the electronic device 701 may request and acquire desired information from the external electronic device 702 by using the VDM while transmitting power. That is, the electronic device 701 may acquire identification information from the external electronic device 702 by using the PD communication-based VDM.

According to one embodiment, the electronic device 701 may transmit a VDM (e.g., 'DiscVconnchange') in operation 752 in response to a request in operation 750 for confirming that the external electronic device 702 is capable of VCONN voltage change, to receive a response signal in operation 756, in response thereto.

For example, when the external electronic device 702 is capable of VCONN voltage change, the electronic device 701 may supply the power of the current voltage of a battery to the external electronic device 702 through the VCONN terminal by using a bypass route that does not pass through a circuit (e.g., the power regulator 328 of FIG. 3 and the IC 427 of FIG. 4A) for boosting the current voltage of the battery.

According to one embodiment, the electronic device 701 may transmit a VDM (e.g., 'DiscVconninput') in operation 762 in response to a request in operation 760 for confirming that the external electronic device 702 can use VCONN as input power, to receive a response signal in operation 766, in response thereto.

According to one embodiment, the external electronic device 702 may include a power switch (e.g., the switching circuit 313 of FIG. 3 and the power switch 413 of FIG. 4A) capable of selectively receiving a VBUS voltage and a VCONN voltage and may include an identification circuit (e.g., identification circuits 316 and 416 in FIGS. 3 and 4A) capable of notifying the electronic device 701 of information that VCONN voltage lower than the default voltage can be used as input power, through PD communication.

As described above, according to one embodiment, the electronic device 701 may supply the VBUS voltage as the input power and determine whether the VCONN voltage is also available as the input power at the same time. To this end, the electronic device 701, after recognizing the Rd and Ra resistances of the CC complex, may identify through VDM whether it is a device that has a default voltage as the initial VCONN voltage and becomes capable of VCONN voltage adjustment when PD communication starts. If the external electronic device 702 is an adjustable VCONN voltage device, the electronic device 701 may determine through the VDM whether the VCONN voltage can also be used as input power.

If all support is possible in a case in which VCONN voltage can be used as input power while the VCONN voltage can be selectively supplied, the external electronic device 702 may request a voltage lower than the VCONN voltage in operation 770, and the external electronic device 702 may transmit a request (e.g., 'Request') for a voltage lower than the current VCONN voltage to the electronic device 701 in operation 772 in response thereto, and receive a response signal (e.g., 'Accept') in operation 776 in response thereto. Accordingly, in response to the request, the electronic device 701 may switch a route such that the current voltage from the battery is not boosted and output as the VCONN voltage by using a bypass route. For example, without passing through a power regulator for boosting the current first voltage from the battery to the second voltage, the first voltage may be supplied as a VCONN voltage to the external electronic device 702 through a connector.

As described above, the electronic device 701 may generate a VCONN voltage using the bypass route in response to a request for a voltage lower than the current VCONN voltage from the external electronic device 702, and the external electronic device 702 may transmit, in operation 780, a PS RDY signal to the electronic device 701 to notify that preparation for power reception has been completed.

Accordingly, the electronic device 701 may supply the VCONN voltage lower than the default voltage to the external electronic device.

The description above shows a case in which the electronic device 701 may transmit a VDM to the external electronic device 702 whenever requesting necessary information, to individually acquire information, for example, ID of the external electronic device, information indicating that the external electronic device is capable of voltage adjustment, and information indicating that the external electronic device is operable at a low voltage, but the electronic device 701 may be implemented to acquire a plurality of pieces of information through one VDM. For example, the VDM may include identification information of the external electronic device 702, and the identification information may include at least one of ID of the external electronic device, information indicating that the external electronic device is capable of voltage adjustment, and information indicating that the external electronic device is operable at a low voltage.

As described above, according to various embodiments, the electronic device 701 may acquire identification information from the external electronic device 702 by using the PD communication-based VDM, and based on the identification information, the electronic device 701 may selectively control the voltage supplied to the external electronic device 702.

Although FIG. 7A shows a case in which identification information related to an electronic device is individually acquired through a plurality of VDMs, the identification information may be acquired at once through one VDM. For example, by transmitting a VDM to the external electronic device 702 in operation 732 of FIG. 7A, the electronic device 701 may provide, at once, various information related to the identification of the electronic device 701, such as the type and identifier of the electronic device 701 and the amount of power affordable to the external electronic device 702. In this case, operation 740 of FIG. 7A to operation 768 of FIG. 7B may be omitted.

Figure 8:
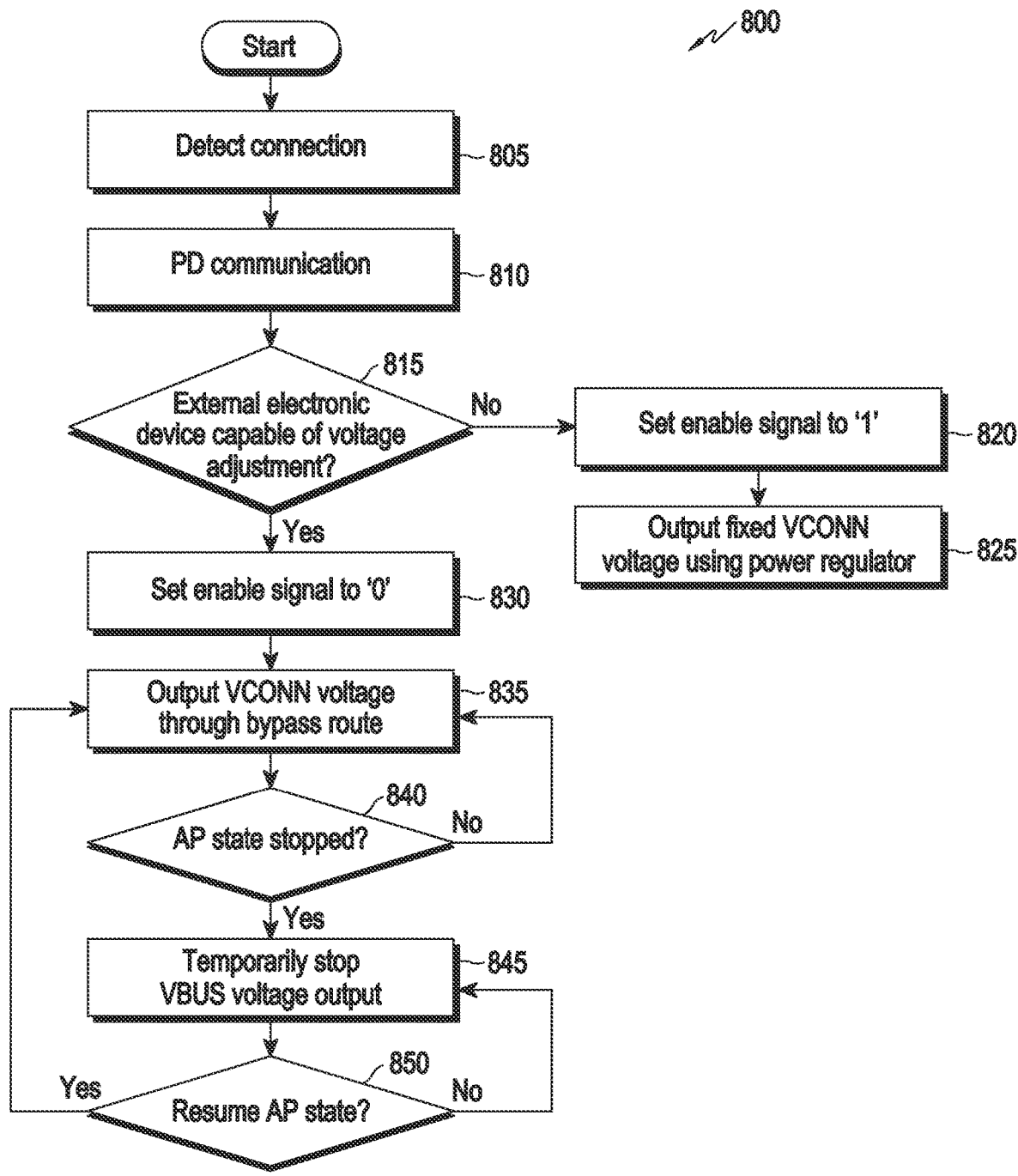
FIG. 8 is a detailed flowchart of an operation by an electronic device for selectively controlling a voltage according to an embodiment of the disclosure.

FIG. 8 is a detailed flowchart 800 of an operation of an electronic device for selectively controlling a voltage according to an embodiment of the disclosure.

Referring to FIG. 8, the operating method may include operations 805 to 850. Each operation of the operating method may be performed by an electronic device (e.g., the electronic device 101 and 301 of FIGS. 1 and 3) and at least one processor (e.g., the processor 120 and 324 of FIGS. 1 and 3) of the electronic device. According to one embodiment, at least one of operations 805 to 850 may be omitted, the order of specific operations may be changed, or another operation may be added.

Referring to FIG. 8, in operation 805, the electronic device may detect connection to an external electronic device (e.g., the external electronic device 302 of FIG. 3) through a signal received through a CC line connected to a CC pin of a connector (e.g., the connector 321 of FIG. 3).

In operation 810, the electronic device may communicate with an external electronic device through PD communication. Accordingly, the electronic device can confirm structured vendor ID (SVID), and when the confirmed VID includes product information of a specific company, all the functions of the external electronic device (e.g., an accessory device) that has transmitted the VID may be confirmed.

In operation 815, the electronic device may determine whether the external electronic device is a device capable of voltage adjustment. According to one embodiment, the electronic device may identify whether the external electronic device is capable of voltage adjustment, based on identification information on the external electronic device acquired through PD communication. For example, the electronic device may confirm the ID of the external electronic device to determine whether the external electronic device is an accessory device capable of receiving power of a VCONN voltage.

If the connected external electronic device is an external electronic device that is not a device capable of voltage adjustment, the electronic device may set an enable signal to '1' in operation 820, the enable signal being transmitted to a power regulator (e.g., the power regulator 328 of FIG. 3) for boosting a first voltage of a battery to a second voltage, to output a fixed VCONN voltage using the power regulator to the external electronic device in operation 825. For example, the default voltage (e.g., a voltage within about 5V to 5.2V) fixed using the power supply regulator such as an external booster IC may be supplied.

On the other hand, if the connected external electronic device is capable of voltage adjustment, the electronic device may set the enable signal to '0' in operation 830 to output a VCONN voltage to the external electronic device through a bypass route in which the first voltage of the battery does not pass through the power regulator.

According to one embodiment, the electronic device may control the output of the VBUS voltage according to the state of the processor (e.g., AP). For example, if the AP state is stopped in operation 840, the electronic device may temporarily stop outputting the VBUS voltage in operation 845.

If an AP state is resumed in operation 850, the aforementioned operation may be performed by return to operation 835, but the operation of temporarily stopping the output of the VBUS voltage in operation 845 may be maintained unless the AP state is not resumed.

As described above, after the PD communication is complete, when the electronic device confirms information that the external electronic device can use VCONN as input power, the electronic device may block the VBUS output by turning off a booster operation of the power regulator through a VBUS disable command. If the electronic device is transitioned to a designated mode, for example, enters a suspended mode, the electronic device may stop VBUS output and may transmit the VBUS output temporarily stopped through a VBUS enable command to an external electronic device, only when the state is resumed.

A relationship between OTG efficiency and power consumption in the electronic device through the above-described operations can be as shown in Table 2 below.

TABLE 2

| Load | OTG efficiency | Power consumption [mW] |
| --- | --- | --- |
| 10 mA | 72% | 52.9 |
| 20 mA | 81% | 105.8 |
| 30 mA | 85% | 158.7 |
| 50 mA | 88% | 264.5 |
| 100 mA | 91% | 529 |

Referring to Table 2, the low load current of 10 to 20 mA may exhibit an efficiency of about 70 to 80%, and the load current of 100 mA may exhibit an efficiency of 90%. According to Table 2, as the load increases, power consumption may increase proportionally, and power consumption can be reduced by using the VCONN voltage lower than a default level instead of the VBUS voltage having a default level.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program 140) including one or more instructions that are stored in a non-transitory storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a non-transitory computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, in a non-transitory storage medium storing instructions, the instructions may be configured to cause at least one processor to perform at least one operation when executed by the at least one processor, and the at least one operation may include detecting connection to an external electronic device through a connector including one or more signal terminals, outputting a second voltage higher than a first voltage from a battery to the external electronic device through the connector, acquiring identification information of the external electronic device, and outputting the first voltage to the external electronic device through the connector by using a bypass route, based on the identification information of the external electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a battery;
a connector comprising one or more signal terminals;
a power regulator configured to adjust a first voltage from the battery to a second voltage;
at least one processor operatively connected to the one or more signal terminals and the power regulator; and
memory storing
instructions that, when executed by the at least one processor, cause the electronic device to:
detect connection to an external electronic device through the connector, wherein the external electronic device is an earphone,
acquire identification information of the external electronic device after outputting the second voltage through the connector to the external electronic device connected through the connector,
in response to the external electronic device being operable at a default voltage supported by the electronic device based on the identification information, maintain outputting the second voltage using the power regulator for boosting the first voltage from the battery to the second voltage to the external electronic device through a VBUS terminal of the connector, wherein the battery is connected to an input terminal of the power regulator, and an output terminal of the power regulator is connected to the connector, and
in response to the external electronic device being operable at a voltage lower than a default voltage supported by the electronic device based on the identification information, output the first voltage supplied from the battery to the external electronic device through a VCONN terminal of the connector by using a bypass path connected to both of the input terminal and the output terminal of the power regulator without passing through the power regulator,
wherein the external electronic device includes a switch configured to selectively receive the second voltage through the VBUS terminal and the first voltage through the VCONN terminal, the second voltage through the VBUS terminal is not provided by the switch to a buck converter of the external electronic device while the first voltage supplied from the battery through the VCONN terminal is output to the buck converter or a configuration channel (CC) power delivery integrated chip (PDIC) of the external electronic device through the switch, wherein the first voltage is lower than the second voltage.

2. The electronic device of claim 1, wherein the instructions cause the electronic device to acquire the identification information from the external electronic device through universal serial bus (USB) power delivery (PD) communication with the external electronic device.

3. The electronic device of claim 2, wherein the instructions cause the electronic device to output the first voltage to the external electronic device through the connector or the VCONN terminal among the one or more signal terminals when the external electronic device is a device capable of voltage adjustment, based on the identification information.

4. The electronic device of claim 2, wherein the identification information comprises at least one of an identification of the external electronic device, information indicating that the external electronic device is capable of voltage adjustment, and information indicating that the external electronic device is operable at a voltage lower than a default voltage supported by the electronic device.

5. The electronic device of claim 1, wherein the instructions cause the electronic device to:
output the second voltage by using the VBUS terminal among the one or more signal terminals when connection to the external electronic device is detected through the connector, and
output the second voltage by using the VCONN terminal among the one or more signal terminals when voltages of at least specific terminals of the one or more signal terminals are detected after the second voltage is output using the VBUS terminal.

6. The electronic device of claim 1, wherein the at least one processor includes a configuration channel (CC) power delivery integrated chip (PDIC).

7. A method performed by an electronic device for selectively controlling a voltage, the method comprising:
detecting connection to an external electronic device through a connector comprising one or more signal terminals;
adjusting, by a power regulator, a first voltage from a battery to a second voltage;
outputting the second voltage to the external electronic device through the connector;
acquiring identification information of the external electronic device;
in response to the external electronic device being operable at a default voltage supported by the electronic device based on the identification information, maintaining outputting the second voltage using the power regulator for boosting the first voltage from the battery to the second voltage to the external electronic device through a VBUS terminal of the connector, wherein the battery is connected to an input terminal of the power regulator, and an output terminal of the power regulator is connected to the connector; and
in response to the external electronic device being operable at a voltage lower than a default voltage supported by the electronic device based on the identification information, outputting the first voltage supplied from the battery to the external electronic device through a VCONN terminal of the connector by using a bypass path connected to both of the input terminal and the output terminal of the power regulator without passing through the power regulator, wherein the external electronic device includes a switch configured to selectively receive the second voltage through the VBUS terminal and the first voltage through the VCONN terminal, the second voltage through the VBUS terminal is not provided by the switch to a buck converter of the external electronic device while the first voltage supplied from the battery through the VCONN terminal is output to the buck converter or a configuration channel (CC) power delivery integrated chip (PDIC) of the external electronic device through the switch, and wherein the first voltage is lower than the second voltage.

8. The method of claim 7, wherein the acquiring of the identification information of the external electronic device comprises acquiring the identification information of the external electronic device through universal serial bus (USB) power delivery (PD) communication with the external electronic device.

9. The method of claim 7, wherein the outputting of the first voltage to the external electronic device through the connector comprises outputting the first voltage to the external electronic device through the connector or the VCONN terminal among the one or more signal terminals when the external electronic device is a device capable of voltage adjustment, based on the identification information.

10. The method of claim 7, wherein the identification information comprises:
at least one of an identification of the external electronic device,
information indicating that the external electronic device is capable of voltage adjustment, and
information indicating that the external electronic device is operatable at a voltage lower than a default voltage supported by the electronic device.

11. The method of claim 7, further comprising:
outputting the second voltage by using the VBUS terminal among the one or more signal terminals when connection to the external electronic device is detected through the connector; and
outputting the second voltage by using the VCONN terminal among the one or more signal terminals when voltages of at least specific terminals of the one or more signal terminals are detected after the second voltage is output using the VBUS terminal.

* * * * *